US012696016B2

(12) United States Patent
Pu

(10) Patent No.: US 12,696,016 B2
(45) Date of Patent: Jul. 28, 2026

(54) METHOD AND APPARATUS FOR DATA TRANSMISSION IN PON, AND SYSTEM

(71) Applicant: Huawei Technologies Co., Ltd., Shenzhen (CN)

(72) Inventor: Yun Pu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 506 days.

(21) Appl. No.: 18/320,750

(22) Filed: May 19, 2023

(65) Prior Publication Data

US 2023/0328414 A1 Oct. 12, 2023

Related U.S. Application Data

(63) Continuation of application No. PCT/CN2021/129670, filed on Nov. 10, 2021.

(30) Foreign Application Priority Data

Nov. 20, 2020 (CN) .......................... 202011312986.8

(51) Int. Cl.
*H04Q 11/00* (2006.01)
(52) U.S. Cl.
CPC . *H04Q 11/0067* (2013.01); *H04Q 2011/0086* (2013.01)
(58) Field of Classification Search
CPC ....... H04Q 11/0067; H04Q 2011/0086; H04Q 11/0062; H04Q 2011/0064; H04B 10/27; H04B 10/2725; H04J 14/08
See application file for complete search history.

(56) References Cited

U.S. PATENT DOCUMENTS

| | | | |
|---|---|---|---|
| 2008/0260385 A1 | 10/2008 | Eguchi | |
| 2010/0208747 A1* | 8/2010 | Gordon | H04J 3/1694 |
| | | | 398/58 |
| 2012/0237216 A1 | 9/2012 | Zhang et al. | |
| 2021/0159984 A1* | 5/2021 | Lee | H04B 10/27 |

FOREIGN PATENT DOCUMENTS

| | | | | |
|---|---|---|---|---|
| CN | 109728927 A | 5/2019 | | |
| EP | 2315397 A1 | 4/2011 | | |
| EP | 2493138 A1 | 8/2012 | | |
| EP | 3429102 B1 * | 12/2021 | .......... | H04J 14/0256 |
| EP | 3605975 B1 * | 2/2024 | ......... | H04L 47/2408 |
| JP | 2008160659 A | 7/2008 | | |

(Continued)

*Primary Examiner* — Hibret A Woldekidan
(74) *Attorney, Agent, or Firm* — Slater Matsil, LLP

(57) ABSTRACT

A method includes: an OLT receives a first data stream, the first data stream includes a first data frame carrying a first service; the OLT slices the first data frame to generate a plurality of first slices, a length of the first slice is a first preset length, and the first slices carry the first service; and the OLT sends a second data stream to an ONU, the second data stream includes the plurality of first slices, a time period in which the OLT sends the second data stream includes a plurality of consecutive scheduling periodicities, at least a part of a time period in each scheduling periodicity is occupied by at least one first slice, and a time interval between at least two consecutive first slices is completely or partially used to transmit data carrying a second service.

20 Claims, 10 Drawing Sheets

(56)         References Cited

FOREIGN PATENT DOCUMENTS

| | | | | |
|---|---|---|---|---|
| JP | 2010273260 | A | 12/2010 | |
| JP | 2012060503 | A | 3/2012 | |
| JP | 2012518319 | A | 8/2012 | |
| JP | 2018520600 | A | 7/2018 | |
| WO | WO-2016187785 | A1 * | 12/2016 | ............ H04B 10/03 |

* cited by examiner

METHOD AND APPARATUS FOR DATA TRANSMISSION IN PON, AND SYSTEM

CROSS-REFERENCE TO RELATED APPLICATIONS

This application is a continuation of International Application No. PCT/CN2021/129670, filed on Nov. 10, 2021, which claims priority to Chinese Patent Application No. 202011312986.8, filed on Nov. 20, 2020. The disclosures of the aforementioned applications are hereby incorporated by reference in their entireties.

TECHNICAL FIELD

The present invention relates to the field of optical communication, and more specifically, to a method and an apparatus for data transmission in a passive optical network PON, and a system.

BACKGROUND

A passive optical network (PON) technology is a point-to-multipoint fiber access technology. A PON system may include an optical line terminal (OLT), an optical distribution network (ODN), and at least one optical network unit (ONU). The OLT is connected to the ODN, and the ODN is connected to a plurality of ONUs. The ONU further includes a service interface, and is connected to user equipment through the service interface.

Taking a gigabit-capable PON (GPON) as an example, GPON encapsulation mode (GEM) frames are used to carry data in the GPON. This is the most basic data structure. Data of various services is encapsulated in the GEM frames and transmitted on GPON lines. The OLT broadcasts the GEM frames to each ONU. The GEM frames include GEM port identifiers. Each ONU identifies, based on the GEM port identifiers, a GEM frame that belongs to the ONU, obtains, through filtering, the GEM frame that belongs to the ONU, and discards GEM frames that do not belong to the ONU. The ONU decapsulates the GEM frame that belongs to the ONU, to form an Ethernet frame, and sends the Ethernet frame to the user equipment through the service interface.

In the PON, in a downstream direction of the OLT, transmission is generally performed based on packet statistical multiplexing. Refer to FIG. 1. An example is taken in which an upstream port of an OLT receives Ethernet frames of three service types. During scheduling, the OLT generally performs scheduling by using an Ethernet frame as a granularity. For example, in FIG. 1, when a sending queue includes an Ethernet frame with a longer packet length, for example, a first Ethernet frame in a sending queue of a service 2 is a longest to-be-sent Ethernet frame currently, once the Ethernet frame with the longer packet length starts to be sent, an Ethernet frame with a shorter packet length in the sending queue needs to wait for completion of the sending of the Ethernet frame with the longer packet length, and then the OLT can send another Ethernet frame with a shorter packet length, leading to a long delay of the Ethernet frame with the shorter packet length. When the sending queue does not include an Ethernet frame with a longer packet length, a delay of an Ethernet frame with a short packet length is low, and consequently, a delay variation of the Ethernet frame with the short packet length is large.

SUMMARY

In view of this, this application provides a method and an apparatus for data transmission in a passive optical network PON, and a system, to reduce a delay and a delay variation of service data transmission in a PON.

According to a first aspect, a method for data transmission is provided. The method includes: An optical line terminal OLT receives a first data stream, where the first data stream includes a first data frame, and the first data frame carries a first service; the OLT slices the first data frame to generate a plurality of first slices, where a length of each first slice is a first preset length; and the OLT sends a second data stream to an optical network unit ONU, where the second data stream includes the plurality of first slices, a time period in which the OLT sends the second data stream includes a plurality of consecutive scheduling periodicities, at least a part of a time period in each scheduling periodicity is occupied by at least one first slice, and a time interval between at least two consecutive first slices is completely or partially used to transmit data carrying a second service. At least one first slice is sent in each scheduling periodicity in a period of sending the first slices. This helps reduce a delay and a delay variation of data transmission of the first service.

According to the first aspect, in a possible implementation, in each scheduling periodicity, the at least one first slice occupies a first preset slot, and the first preset slot satisfies at least one of having fixed duration and having a fixed slot central position. In each scheduling periodicity, duration of the first preset slot is fixed. This ensures that the first slice can be transmitted for fixed duration in each scheduling periodicity. In other words, data carrying the first service can be transmitted for the duration of the first preset slot. This further helps reduce the delay of data transmission of the first service. Alternatively, in each scheduling periodicity, a slot central position of the first preset slot is fixed in the scheduling periodicity. This ensures that in each scheduling periodicity, the first slice can be transmitted at a fixed slot central position. This further helps reduce the delay variation of data transmission of the first service. Alternatively, in each scheduling periodicity, duration of the first preset slot is fixed, and a slot central position of the first preset slot in the scheduling periodicity is fixed. This ensures that in each scheduling periodicity, the first slice can be transmitted for fixed duration at a fixed slot position. This further helps reduce the delay of data transmission of the first service, and reduce the delay variation of data transmission of the first service.

According to the first aspect or the foregoing possible implementation of the first aspect, in another possible implementation, when a second data frame for carrying the second service exists in the first data stream, the method further includes: The OLT generates at least one second slice based on the second data frame. A length of the second slice is the first preset length. The second slice carries the second service. The second data stream further includes the second slice. The OLT sends the at least one second slice in each scheduling periodicity in a period of sending the second slice. In an implementation, the at least one second slice sent in each scheduling periodicity occupies a second preset slot, and the second preset slot satisfies at least one of having fixed duration and having a fixed slot central position. This ensures that in each scheduling periodicity, the data frame of the first service can be transmitted for duration of the first preset slot, and the data frame of the second service can be transmitted for duration of the second preset slot. This helps reduce delays of data transmission of the first service and the second service, and ensures that delays and delay variations of data transmission of a plurality of services can be reduced.

According to the first aspect or any one of the foregoing possible implementations of the first aspect, in another possible implementation, when the second data frame for carrying the second service does not exist in the first data stream, the second slice for carrying the second service does not exist in the correspondingly sent second data stream, and the method further includes: The OLT generates at least one first idle frame. A length of the first idle frame is a first preset length. The second data stream further includes the first idle frame. In each scheduling periodicity in a period when the second slice does not exist in the second data stream, the at least one first idle frame occupies the second preset slot. Therefore, even if the second service has no traffic currently, the first idle frame is still inserted into the second data stream, to occupy the second preset slot for transmitting the second service. When the second service suddenly has traffic at a next moment, the second service data can still occupy the second preset slot, so that the delay and the delay variation of transmission of the second service can be effectively and stably reduced.

According to the first aspect or any one of the foregoing possible implementations of the first aspect, in another possible implementation, the first data frame is an Ethernet frame or an optical data unit ODU frame.

According to a second aspect, a method for data transmission is provided. The method includes: An ONU receives a second data stream sent by an OLT, where the second data stream includes a plurality of first slices, a length of the first slice is a first preset length, the first slices carry a first service, a time period in which the ONU receives the second data stream includes a plurality of consecutive scheduling periodicities, at least a part of a time period in each scheduling periodicity is occupied by at least one first slice, a time interval between at least two consecutive first slices is completely or partially used to transmit data carrying a second service, and the first slice includes a second payload; the ONU identifies each first slice, and extracts the second payload in each first slice; and the ONU reassembles the extracted second payloads to generate a first data frame. At least one first slice is received in each scheduling periodicity in a period of receiving the first slices. This helps reduce a delay and a delay variation of data transmission of the first service.

According to the second aspect, in a possible implementation, in each scheduling periodicity, the at least one first slice occupies a first preset slot, and the first preset slot satisfies at least one of having fixed duration and having a fixed slot central position. In each scheduling periodicity, duration of the first preset slot is fixed. This ensures that the first slice can be transmitted for fixed duration in each scheduling periodicity. In other words, data carrying the first service can be transmitted for the duration of the first preset slot. This further helps reduce the delay of data transmission of the first service. Alternatively, in each scheduling periodicity, a slot central position of the first preset slot is fixed in the scheduling periodicity. This ensures that in each scheduling periodicity, the first slice can be transmitted at a fixed slot central position. This further helps reduce the delay variation of data transmission of the first service. Alternatively, in each scheduling periodicity, duration of the first preset slot is fixed, and a slot central position of the first preset slot in the scheduling periodicity is fixed. This ensures that in each scheduling periodicity, the first slice can be transmitted for fixed duration at a fixed slot position. This further helps reduce the delay of data transmission of the first service, and reduce the delay variation of data transmission of the first service.

According to the second aspect or the foregoing possible implementation of the second aspect, in another possible implementation, the second data stream further includes second slices. A length of the second slice is a first preset length. The second slices carry a second service. The time interval is completely or partially used to transmit at least one second slice. The second slice includes a fourth payload. The method further includes: The ONU identifies each second slice carrying the second service, and extracts the fourth payload in each second slice; and the ONU reassembles the extracted fourth payloads to generate a second data frame. This ensures that in each scheduling periodicity, the data frame of the first service can be transmitted for duration of the first preset slot, and the data frame of the second service can be transmitted for duration of the second preset slot. This helps reduce delays of data transmission of the first service and the second service, and ensures that delays and delay variations of data transmission of a plurality of services can be reduced.

According to the second aspect or the foregoing possible implementation of the second aspect, in another possible implementation, the second data stream further includes at least one first idle frame. A length of the first idle frame is the first preset length. The time interval is completely or partially used to transmit the at least one first idle frame. The at least one first idle frame in the scheduling periodicity occupies the second preset slot. Therefore, even if the second service has no traffic currently, the first idle frame is still inserted into the second data stream, to occupy the second preset slot for transmitting the second service. When the second service suddenly has traffic at a next moment, the second service data can still occupy the second preset slot, so that the delay and the delay variation of transmission of the second service can be effectively and stably reduced.

According to a third aspect, an apparatus for data transmission is provided. The apparatus includes: a first receiving module, configured to receive a first data stream, where the first data stream includes a first data frame, and the first data frame carries a first service; a generating module, configured to slice the first data frame to generate a plurality of first slices, where a length of the first slice is a first preset length; and a sending module, configured to send a second data stream, where the second data stream includes the plurality of first slices, a time period in which the apparatus sends the second data stream includes a plurality of consecutive scheduling periodicity, at least a part of a time period in each scheduling periodicity is occupied by at least one first slice, and a time interval between at least two consecutive first slices is completely or partially used to transmit data carrying a second service. At least one first slice is sent in each scheduling periodicity in a period of sending the first slices. This helps reduce a delay and a delay variation of data transmission of the first service.

According to the third aspect, in a possible implementation, at least one first slice sent in each scheduling periodicity occupies a first preset slot, and the first preset slot satisfies at least one of having fixed duration and having a fixed slot central position. In each scheduling periodicity, duration of the first preset slot is fixed. This ensures that the first slice can be transmitted for fixed duration in each scheduling periodicity. In other words, data carrying the first service can be transmitted for the duration of the first preset slot. This further helps reduce the delay of data transmission of the first service. Alternatively, in each scheduling periodicity, a slot central position of the first preset slot is fixed in the scheduling periodicity. This ensures that in each scheduling periodicity, the first slice can be transmitted at a fixed slot central position. This further helps reduce the delay variation of data transmission of the first service. Alternatively, in each scheduling periodicity, duration of the first preset slot is fixed, and a slot central position of the first preset slot in the scheduling periodicity is fixed. This ensures that in each scheduling periodicity, the first slice can be transmitted for fixed duration at a fixed slot position. This further helps reduce the delay of data transmission of the first service, and reduce the delay variation of data transmission of the first service.

According to the third aspect or the foregoing possible implementation of the third aspect, in another possible implementation, a second data frame for carrying the second service exists in the first data stream. The generating module is further configured to slice the second data frame to generate a plurality of second slices. A length of the second slice is the first preset length. The second data stream further includes the second slices. The time interval is completely or partially used to transmit at least one second slice. This ensures that in each scheduling periodicity, the data frame of the first service can be transmitted for duration of the first preset slot, and the data frame of the second service can be transmitted for duration of the second preset slot. This helps reduce delays of data transmission of the first service and the second service, and ensures that delays and delay variations of data transmission of a plurality of services can be reduced.

According to a fourth aspect, an apparatus for data transmission is provided. The apparatus includes: a second receiving module, configured to receive a second data stream sent by an optical line terminal OLT, where the second data stream includes a plurality of first slices, a length of the first slice is a first preset length, the first slices carry a first service, a time period in which the second receiving module receives the second data stream includes a plurality of consecutive scheduling periodicities, at least a part of a time period in each scheduling periodicity is occupied by at least one first slice, a time interval between at least two consecutive first slices is completely or partially used to transmit data carrying a second service, and the first slice includes a second payload; an extracting module, configured to identify each first slice, and extract the second payload in each first slice; and a reassembling module, configured to reassemble the extracted second payloads to generate a first data frame. At least one first slice is received in each scheduling periodicity in a period of receiving the first slices. This helps reduce a delay and a delay variation of data transmission of the first service.

According to the fourth aspect, in a possible implementation, the at least one first slice received by the apparatus in each scheduling periodicity occupies a first preset slot, and the first preset slot satisfies at least one of having fixed duration and having a fixed slot central position. In each scheduling periodicity, duration of the first preset slot is fixed. This ensures that the first slice can be transmitted for fixed duration in each scheduling periodicity. In other words, data carrying the first service can be transmitted for the duration of the first preset slot. This further helps reduce the delay of data transmission of the first service. Alternatively, in each scheduling periodicity, a slot central position of the first preset slot is fixed in the scheduling periodicity. This ensures that in each scheduling periodicity, the first slice can be transmitted at a fixed slot central position. This further helps reduce the delay variation of data transmission of the first service. Alternatively, in each scheduling periodicity, duration of the first preset slot is fixed, and a slot central position of the first preset slot in the scheduling periodicity is fixed. This ensures that in each scheduling periodicity, the first slice can be transmitted for fixed duration at a fixed slot position. This further helps reduce the delay of data transmission of the first service, and reduce the delay variation of data transmission of the first service.

According to the fourth aspect or the foregoing possible implementation of the fourth aspect, in another possible implementation, the second data stream further includes second slices. A length of the second slice is the first preset length. The second slices carry a second service. The time interval is completely or partially used to transmit at least one second slice. The second slice includes a fourth payload. The extracting module is further configured to identify each second slice carrying the second service, and extract the fourth payload in each second slice. The reassembling module is further configured to reassemble the extracted fourth payloads to generate a second data frame. This ensures that in each scheduling periodicity, the data frame of the first service can be transmitted for the duration of the first preset slot, and the data frame of the second service can be transmitted for duration of the second preset slot. This helps reduce delays of data transmission of the first service and the second service, and ensures that delays and delay variations of data transmission of a plurality of services can be reduced.

According to a fifth aspect, a communication system is provided. The communication system includes the apparatuses for data transmission according to the fourth aspect.

According to a sixth aspect, a communication device is provided. The communication device includes a processor and a transceiver. The transceiver is configured to receive a first data stream. The first data stream includes a first data frame. The first data frame carries a first service. The processor is configured to slice the first data frame to generate a plurality of first slices. A length of the first slice is a first preset length. The first slices carry the first service. The transceiver is further configured to send a second data stream. The second data stream includes the plurality of first slices. A time period in which the transceiver sends the second data stream includes a plurality of consecutive scheduling periodicities. At least a part of a time period in each scheduling periodicity is occupied by at least one first slice. A time interval between at least two consecutive first slices is completely or partially used to transmit data carrying a second service. The communication device also has the beneficial effects described above, and details are not described herein again.

According to a seventh aspect, a communication device is provided. The communication device includes a processor and a transceiver. The transceiver is configured to receive a second data stream sent by an OLT. The second data stream includes a plurality of first slices. A length of the first slice is a first preset length. The first slices carry a first service. A time period in which the transceiver receives the second data stream includes a plurality of consecutive scheduling periodicities. At least a part of a time period in each scheduling periodicity is occupied by at least one first slice. A time interval between at least two consecutive first slices is completely or partially used to transmit data carrying a second service. The first slice includes a second payload. The processor is configured to identify each first slice carrying the first service, and extract the second payload in each first slice. The processor is further configured to reassemble the extracted second payloads to generate a first data frame. The communication device also has the beneficial effects described above, and details are not described herein again.

According to another aspect of this application, a computer-readable storage medium is provided. The computer-readable storage medium stores computer software instructions used by the apparatus for data transmission or the communication device according to the third aspect or the sixth aspect. When the computer software instructions are run on a computer, the computer is enabled to perform the methods according to the foregoing aspects.

According to still another aspect of this application, a computer program product is provided. The computer program product stores computer software instructions used by the apparatus for data transmission or the communication device according to the fourth aspect or the seventh aspect. When the computer software instructions are run on a computer, the computer is enabled to perform the methods according to the foregoing aspects.

DETAILED DESCRIPTION OF ILLUSTRATIVE EMBODIMENTS

The following describes the technical solutions in embodiments of the present invention with reference to the accompanying drawings in embodiments of the present invention.

The technical solutions in embodiments of this application may be applied to various passive optical network (PON) systems, for example, a next-generation PON (NG-PON), an NG-PON 1, an NG-PON 2, a gigabit-capable PON (GPON), a 10 gigabit per second PON (XG-PON), a 10-gigabit-capable symmetric passive optical network (XGS-PON), an Ethernet PON (EPON), a 10 gigabit per second EPON (10G-EPON), a next-generation EPON (NG-EPON), a wavelength-division multiplexing (WDM) PON, a time- and wavelength-division multiplexing (TWDM) PON, a point-to-point (P2P) WDM PON (P2P-WDM PON), an asynchronous transfer mode PON (APON), a broadband PON (BPON), and the like, and a 25 gigabit per second PON (25G-PON), a 50 gigabit per second PON (50G-PON), a 100 gigabit per second PON (100G-PON), a 25 gigabit per second EPON (25G-EPON), a 50 gigabit per second EPON (50G-EPON), a 100 gigabit per second EPON (100G-EPON), and a GPON and an EPON at other rates.

Figure 1:
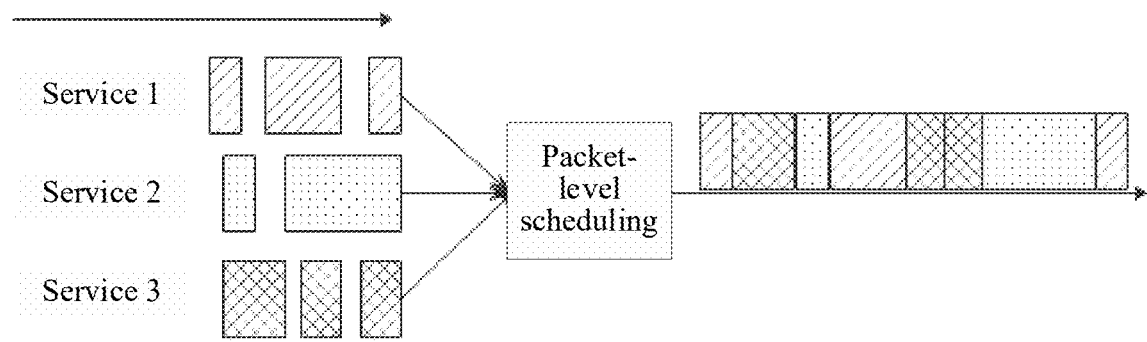
FIG. 1 is a schematic example diagram of scheduling an Ethernet frame by an OLT in a current technology.
Figure 2:
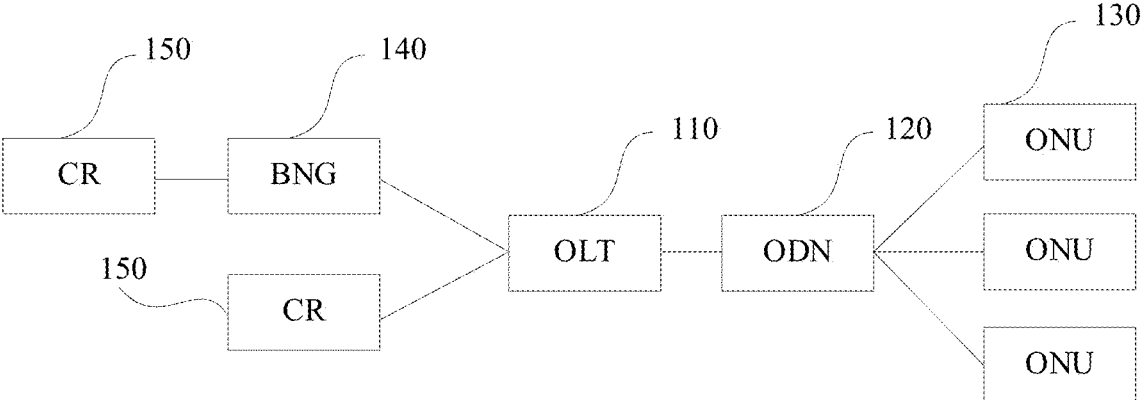
FIG. 2 is a schematic diagram of an application scenario according to an embodiment of the present invention.

FIG. 2 is a schematic diagram of an application scenario according to an embodiment of the present invention. Refer to FIG. 2. It can be learned that a PON system includes an OLT 110, an ODN 120, and an ONU 130. The OLT includes at least one upstream port, the upstream port of the OLT is connected to a broadband network gateway (BNG) 140, an upstream port of the BNG is connected to a core router (CR) 150, and the upstream port of the OLT receives an Ethernet frame (which may also be referred to as an Ethernet packet) sent by the CR through the BNG. The upstream port of the OLT may alternatively be directly connected to the CR, and the OLT directly receives the Ethernet frame sent by the CR.

It may be understood that, Ethernet frames received by the OLT may include Ethernet frames carrying services of different types. For example, an Ethernet frame 1 carries a service 1, and an Ethernet frame 2 carries a service 2.

In an embodiment, an Ethernet frame includes a service identifier that identifies a service carried in the Ethernet frame. The OLT identifies, based on the service identifier in the Ethernet frame, the service carried in the Ethernet frame. It may be understood that, the Ethernet frame may be a common Ethernet frame (for example, an Ethernet frame received from the BNG), and the service identifier is a virtual local area network (VLAN) identifier (ID); or the Ethernet frame is an Ethernet frame encapsulated through a tunnel (for example, an Ethernet frame directly received from the CR), and the service identifier is a service identifier field in a tunnel header.

In another embodiment, the OLT may identify, through the upstream port that receives the Ethernet frame, the service carried in the Ethernet frame. For example, an upstream port 1 of the OLT is configured to receive the Ethernet frame 1 carrying the service 1, and an upstream port 2 is configured to receive the Ethernet frame 2 carrying the service 2. By default, the Ethernet frame received by the upstream port 1 of the OLT carries the service 1, and the Ethernet frame received by the upstream port 2 carries the service 2.

Figure 3:
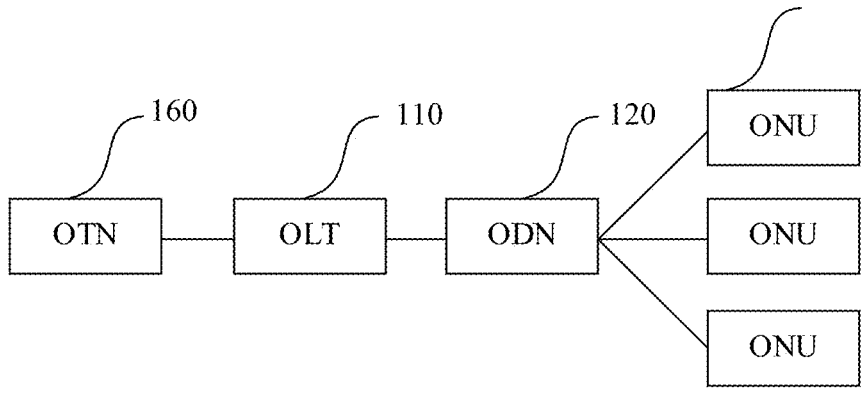
FIG. 3 is a schematic diagram of an application scenario according to another embodiment of the present invention.

FIG. 3 is a schematic diagram of an application scenario according to another embodiment of the present invention. Refer to FIG. 3. It can be learned that a PON system includes an OLT, an ODN, and an ONT. The OLT includes at least one upstream port. The upstream port of the OLT is connected to an optical transport network (OTN) device 160, and is configured to receive an optical data unit (ODU) frame sent by the OTN device. The ODU frame is also referred to as an optical channel data unit frame.

It may be understood that, ODU frames received by the OLT may include ODU frames carrying services of different types. For example, an ODU frame 1 carries a service 1, and an ODU frame 2 carries a service 2.

In an embodiment, the ODU frame includes a service identifier that identifies a service carried in the ODU frame. The OLT identifies, according to the service identifier in the ODU frame, a service carried in the ODU frame.

In another embodiment, the OLT may identify, through the upstream port that receives the ODU frame, the service carried in the ODU frame. For example, an upstream port 1 of the OLT is configured to receive the ODU frame 1 carrying the service 1, and an upstream port 2 is configured to receive the ODU frame 2 carrying the service 2. By default, the ODU frame received by the upstream port 1 of the OLT carries the service 1, and the ODU frame received by the upstream port 2 carries the service 2.

It may be understood that, the application scenarios shown in FIG. 2 and FIG. 3 are merely examples. In actual application, an apparatus or a device connected to the upstream port of the OLT is not limited to the foregoing two examples.

For ease of description, data streams received by the upstream port of the OLT are collectively referred to as a first data stream below. The first data stream includes data frames, and the data frames may be the Ethernet frames in the scenario in FIG. 2, the ODU frames in the scenario in FIG. 3, or frames in another scenario. Based on different services carried in the data frames, for example, the data frames may be divided into a first data frame carrying a first service and a second data frame carrying a second service, and the like. The Ethernet frames, the ODU frames, or the frames in another form above may be collectively referred to as the first data frame or the second data frame.

Figure 9:
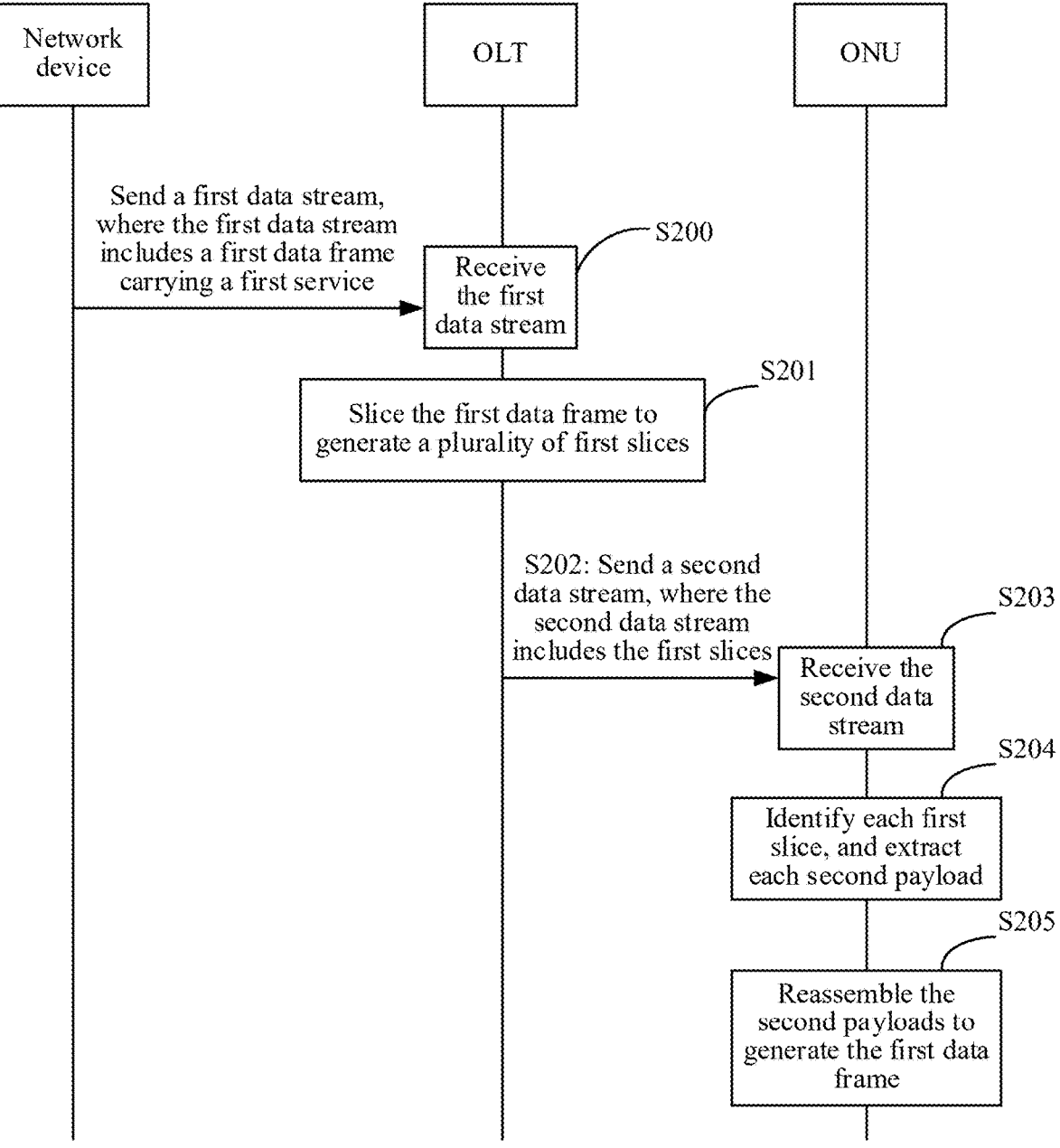
FIG. 9 is a schematic diagram of a method for data transmission according to an embodiment of the present invention.

The following provides a method for data transmission in a PON. FIG. 9 is a schematic diagram of a method for data transmission according to an embodiment of the present invention. The method includes:

Step S200: An OLT receives a first data stream, where the first data stream includes a first data frame, and the first data frame carries a first service.

Step S201: The OLT slices the first data frame to generate a plurality of first slices, where a length of each first slice is a first preset length, and the first slices carry the first service.

For example, in a GPON, the first slice is a GEM frame. In an XGPON, the first slice is an XGEM frame. It may be understood that, in a PON system of another type, the first slice is of another corresponding encapsulation type, and details are not described herein again.

Figures 4, 5, 6:
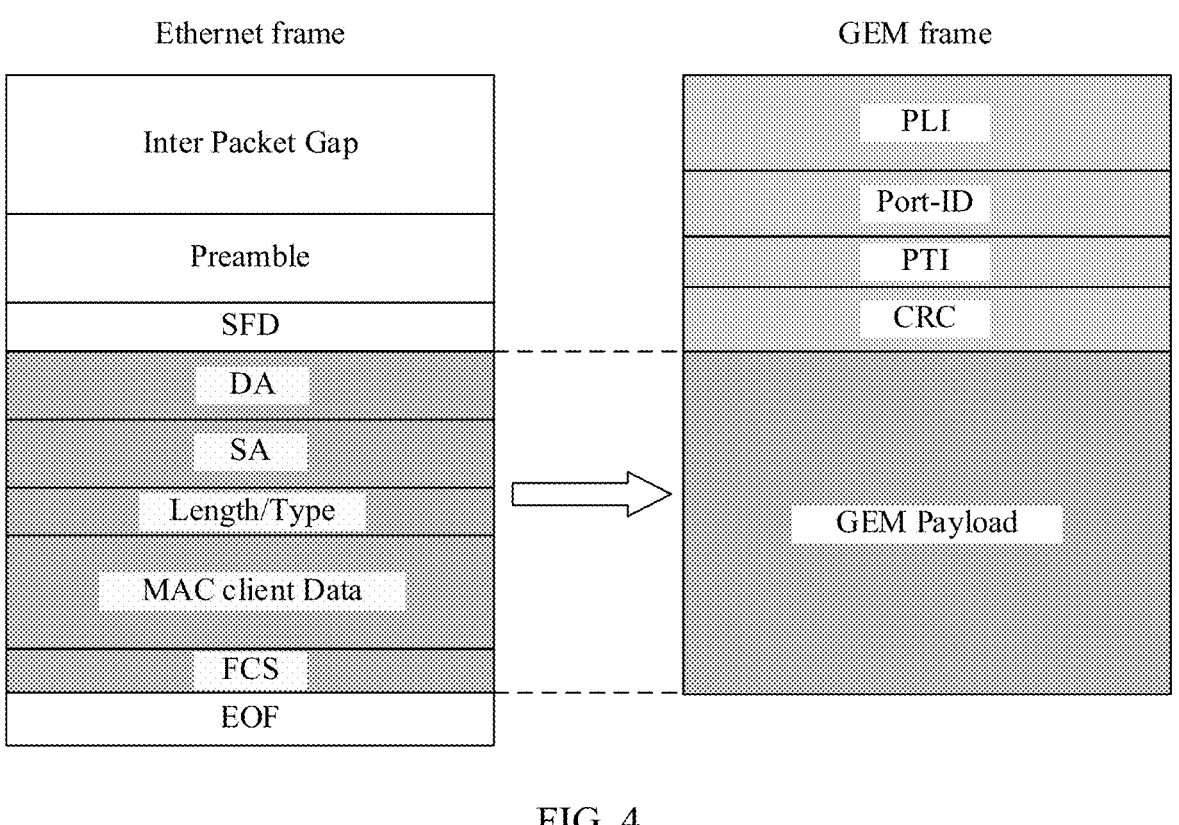
FIG. 4 is a schematic diagram of an Ethernet frame according to an embodiment of the present invention.
FIG. 5 is a schematic diagram of scheduling in which at least one first slice is sent in each scheduling periodicity according to an embodiment of the present invention.
FIG. 6 is a schematic diagram of scheduling in which duration of a first preset slot occupied for sending a first slice in each scheduling periodicity is fixed according to an embodiment of the present invention.

The first data frame includes a first payload and another field. As shown in FIG. 4, an example in which the first data frame is an Ethernet frame is used. FIG. 4 is a schematic diagram of converting an Ethernet frame into a GEM frame according to an embodiment of the present invention. The first payload may include, for example, a destination address (DA) field, a source address (SA) field, a length/type field, a media access control (MAC) client data field, and a frame check sequence (FCS) field. Other fields in the first data frame may include, for example, an interpacket gap (IPG) field. a preamble field, a start-of-frame delimiter (SFD) field, and an end-of-frame (EOF) field.

Step S201 includes: The OLT divides the first payload into at least two parts if a length of the first payload is greater than a second preset length, where a second payload is generated correspondingly to each part, a length of the second payload is equal to the second preset length, and the second preset length is less than the first preset length; and the OLT adds a frame header to each second payload to form the first slice, where any one of the second payloads satisfies one of the following condition 1 and condition 2:

condition 1: the second payload includes a part obtained by dividing the first payload; and condition 2: the second payload includes a part obtained by dividing the first payload and a padding bit.

For example, the second preset length is 66 bytes and the length of the first payload is 168 bytes. Therefore, the length of the first payload is greater than 66 bytes, and the OLT may divide the first payload into three parts.

In an embodiment, in the three parts obtained through division, the first part and the second part are both 66 bytes in length, and the third part is 36 bytes in length. The first part and the second part are the second payload (the condition 1 is satisfied). The third part and a 30-byte padding bit form a 66-byte second payload (the condition 2 is satisfied).

In another embodiment, in the three parts obtained through division, a length of each part is 56 bytes, and each part and a 10-byte padding bit form a 66-byte second payload (the condition 2 is satisfied) respectively.

It may be understood that, the foregoing description is merely an example, and the length of each part obtained by dividing the first payload may be selected based on an actual requirement, provided that the second payload satisfies either of the foregoing conditions 1 and 2.

In an example in which the first slice is a GEM frame, as shown in FIG. 4, the GEM frame includes a frame header and the second payload, and the frame header includes a PLI field, a Port-ID field, a PTI field, and a HEC field. The PLI indicates the length of the second payload. The Port ID uniquely identifies a different GEM port. The PTI indicates a payload type identifier, and mainly identifies a status and a type of currently transmitted data, for example, information about whether the data is an OAM (Operation, Administration and Maintenance) message, or whether transmission of the data is completed. The HEC provides a forward error correction coding function to ensure transmission quality.

Step S202: The OLT sends a second data stream to an optical network unit ONU, where the second data stream includes the plurality of first slices, a time period in which the OLT sends the second data stream includes a plurality of consecutive scheduling periodicities, at least a part of a time period in each scheduling periodicity is occupied by at least one first slice, and a time interval between at least two consecutive first slices is completely or partially used to transmit data carrying a second service. It may be understood that, the time period for sending the second data stream may include a plurality of scheduling periodicities, and at least one first slice is sent in each scheduling periodicity. As shown in FIG. 5, in five scheduling periodicities TP1 to TP5, at least one first slice is sent in each scheduling periodicity from TP2 to TP4, and no first slice is sent in TP1 and TP5. Therefore, the time period from TP2 to TP4 may be referred to as a time period for sending the second data stream. At least one first slice is sent in each scheduling periodicity of the time period for sending the second data stream. This helps reduce a delay and a delay variation of data transmission of the first service.

In an embodiment, the at least one first slice sent in each scheduling periodicity occupies a first preset slot. The first preset slot satisfies at least one of having fixed duration and having a fixed slot central position.

In an embodiment, as shown in FIG. 6, in each scheduling periodicity, duration of the first preset slot is fixed. This ensures that the first slice can be transmitted for fixed duration in each scheduling periodicity. In other words, data carrying the first service can be transmitted for the duration of the first preset slot. This further helps reduce the delay of data transmission of the first service.

Figures 7, 8:
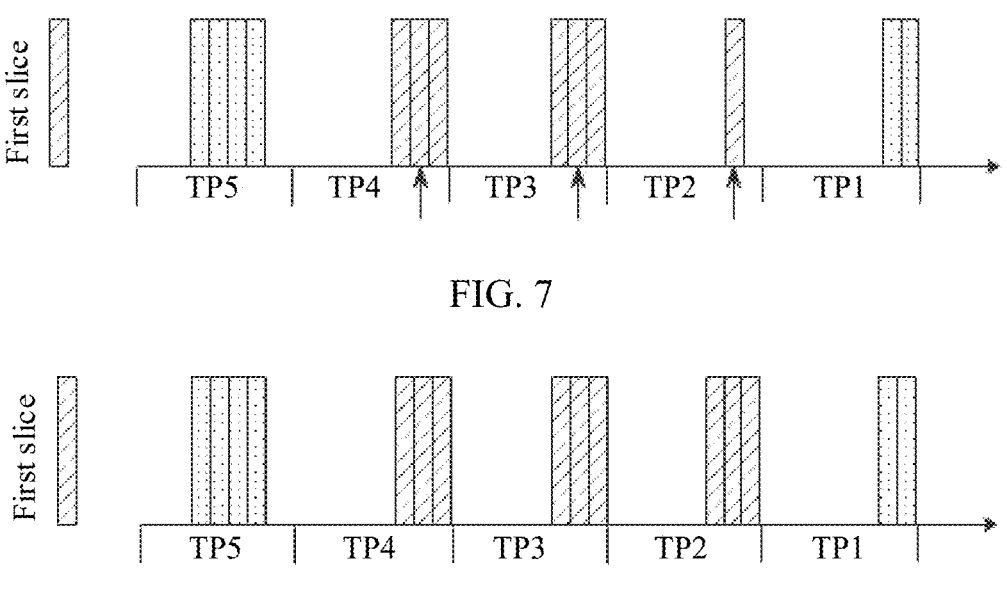
FIG. 7 is a schematic diagram of scheduling in which a slot central position of a first preset slot occupied for sending a first slice in each scheduling periodicity is fixed according to an embodiment of the present invention.
FIG. 8 is a schematic diagram of scheduling in which duration and a slot central position of a first preset slot occupied for sending a first slice in each scheduling periodicity are fixed according to an embodiment of the present invention.

In an embodiment, as shown in FIG. 7, in each scheduling period, a slot central position of the first preset slot is fixed in the scheduling periodicity. This ensures that in each scheduling periodicity, the first slice can be transmitted at a fixed slot central position. This further helps reduce the delay variation of data transmission of the first service.

In an embodiment, as shown in FIG. 8, in each scheduling periodicity, the duration of the first preset slot is fixed, and the slot central position of the first preset slot in the scheduling periodicity is fixed. This ensures that in each scheduling periodicity, the first slice can be transmitted for fixed duration at a fixed slot position. This further helps reduce the delay of data transmission of the first service, and reduce the delay variation of data transmission of the first service.

Step S203: The ONU receives the second data stream sent by the OLT, where the second data stream includes the first slices.

Step S204: The ONU identifies each first slice carrying the first service, and extracts the second payload in each first slice.

Step S205: The ONU reassembles the extracted second payloads to generate the first data frame. For example, the ONU may reassemble the second payloads to generate the first payload, and then add a corresponding frame header before the first payload, to generate the first data frame.

Figure 16:
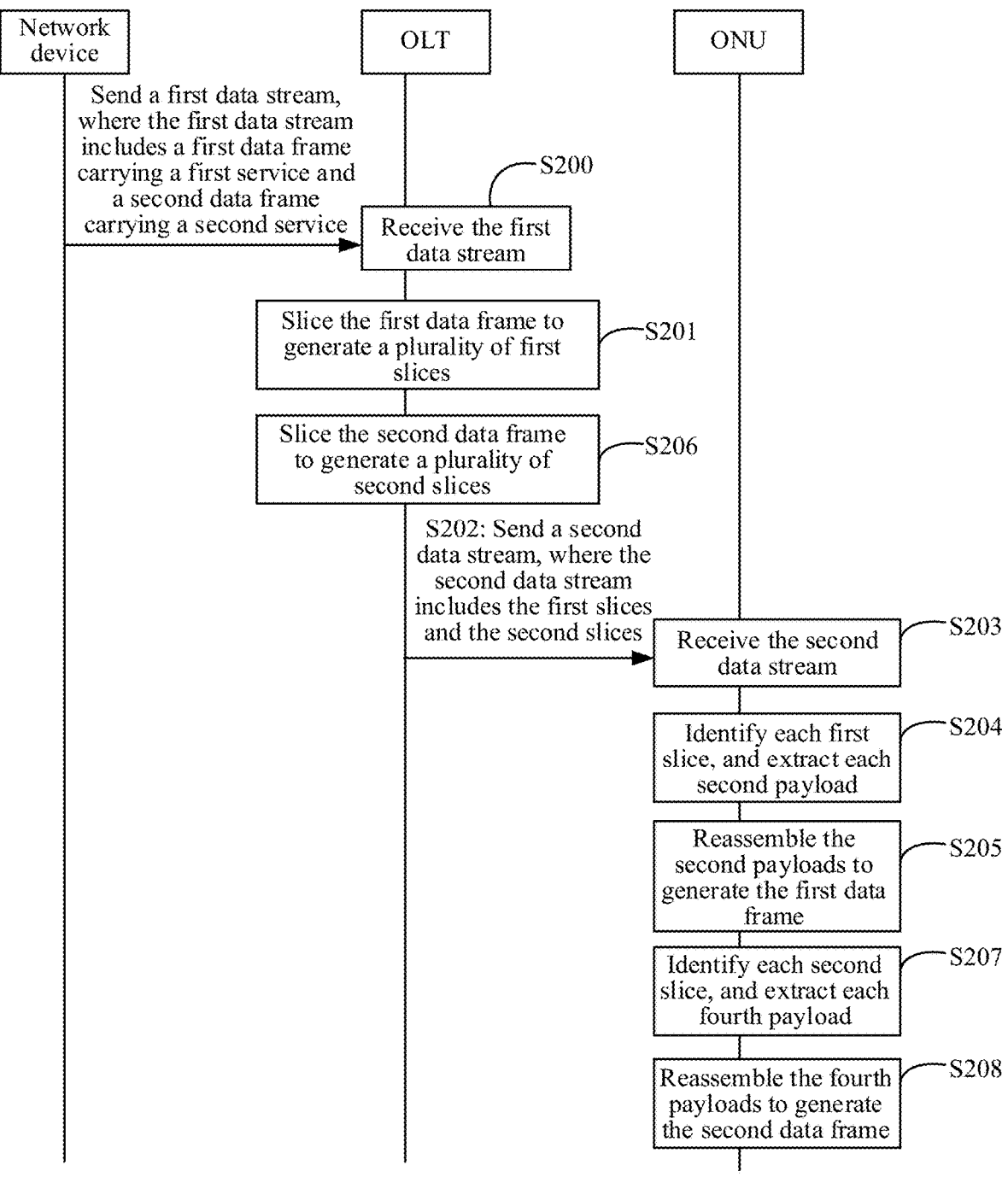
FIG. 16 is a schematic diagram of a method for data transmission according to another embodiment of the present invention.

It may be understood that, in another embodiment, the first data stream received by the OLT may include data frames of at least two services. For example, in addition to the first data frame carrying the first service, the first data stream may further include a second data frame carrying the second service. As shown in FIG. 16, the method further includes:

Step S206: The OLT slices the second data frame to generate a plurality of second slices, where a length of the second slice is the first preset length, and the second slices carry the second service.

It may be understood that, details of step S206 are similar to those of step S201, the second data frame is similar to the first data frame, and the second slices are similar to the first slices. Details are not described herein again.

Figures 10, 11, 12, 13:
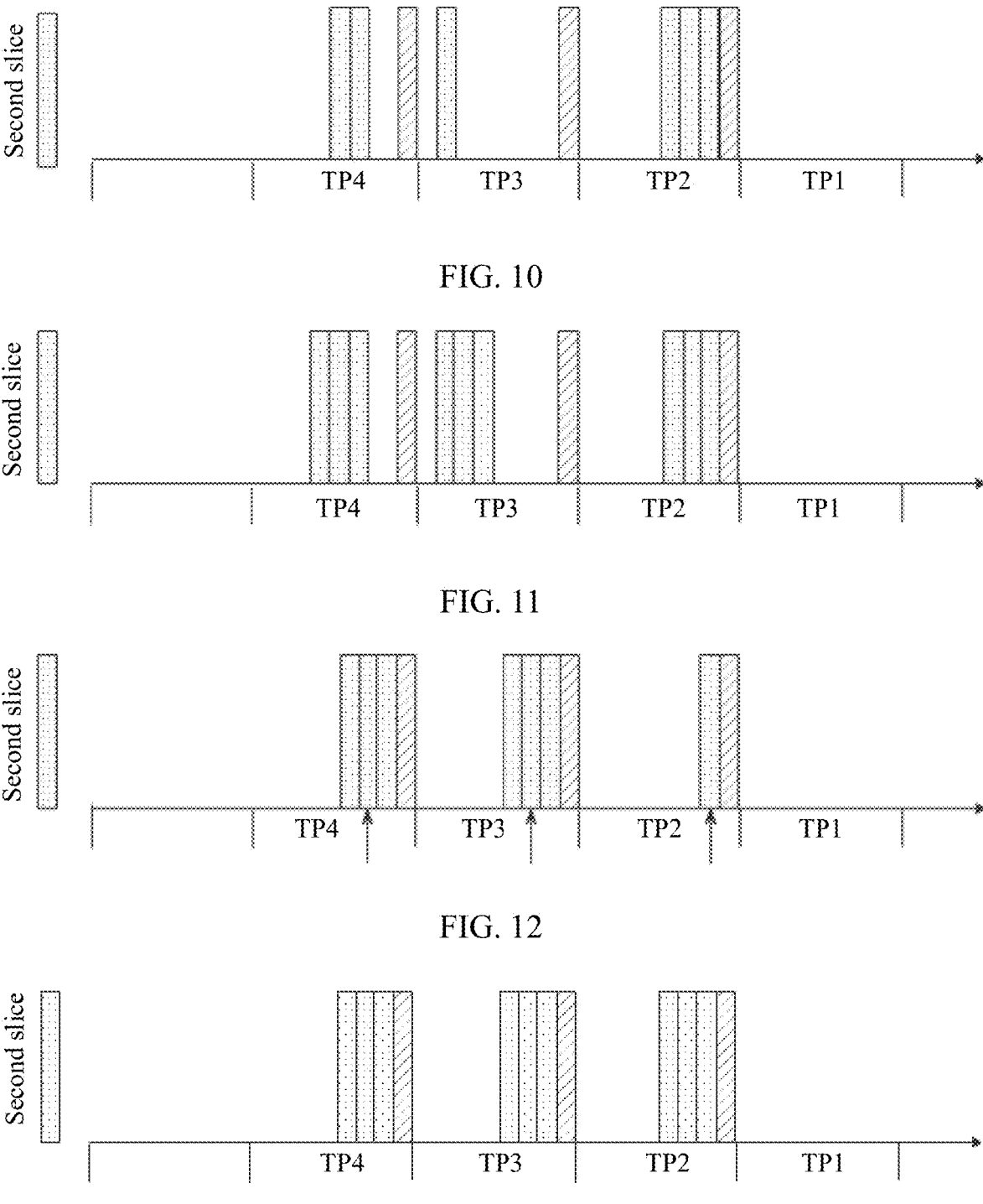
FIG. 10 is a schematic diagram of scheduling in which at least one second slice is sent in each scheduling periodicity according to an embodiment of the present invention.
FIG. 11 is a schematic diagram of scheduling in which duration of a second preset slot occupied for sending a second slice in each scheduling periodicity is fixed according to an embodiment of the present invention.
FIG. 12 is a schematic diagram of scheduling in which a slot central position of a second preset slot occupied for sending a second slice in each scheduling periodicity is fixed according to an embodiment of the present invention.
FIG. 13 is a schematic diagram of scheduling in which duration and a slot central position of a second preset slot occupied for sending a second slice in each scheduling periodicity are fixed according to an embodiment of the present invention.

The second data stream further includes the second slices, and the time interval is completely or partially used to transmit at least one second slice. At least one second slice sent in each scheduling periodicity occupies a second preset slot, where the second preset slot satisfies at least one of having fixed duration and having a fixed slot central position. For example, the duration and the slot central position of the first preset slot are fixed. Refer to FIG. 10 to FIG. 13. FIG. 10 is a schematic diagram of scheduling in which at least one second slice is sent in each scheduling periodicity. FIG. 11 is a schematic diagram of scheduling in which duration of the second preset slot occupied by the second slice sent in each scheduling periodicity is fixed. FIG. 12 is a schematic diagram of scheduling in which a fixed slot central position occupied by the second slice sent in each scheduling periodicity is fixed. FIG. 13 is a schematic diagram of scheduling in which the duration and the slot central position occupied by the second slice sent in each scheduling periodicity are fixed. For a detailed description, refer to related descriptions in step S202. Principles and beneficial effects are similar, and details are not described herein again.

In the foregoing step S203, the second data stream further includes the second slices.

Step S207: The ONU identifies each second slice carrying the second service, and extracts a fourth payload in each second slice.

Step S208: The ONU reassembles the extracted fourth payloads to generate the second data frame.

It may be understood that, for details of receiving and processing the second slices on the ONU side, refer to the related descriptions of steps S203, S204, and S205. The foregoing beneficial effects are also achieved, and details are not described herein again.

In this embodiment, the first slice carrying the first service occupies the first preset slot in each scheduling periodicity, and the second slice carrying the second service occupies the second preset slot in each scheduling period. This ensures that in each scheduling periodicity, the data frame of the first service can be transmitted for duration of the first preset slot, and the data frame of the second service can be transmitted for duration of the second preset slot. This helps reduce the delays of data transmission of the first service and the second service, and ensures that delays and delay variations of data transmission of a plurality of services can be reduced.

It may be understood that, the first data stream may further include another data frame carrying a third service or more services. A principle and beneficial effects are similar to those described above, and details are not described again.

In another embodiment, a service data may be discontinuous, and there may be no data of a service in a time period. For example, in a time period, a data stream received by the OLT includes both the first data frame carrying the first service and the first slice carrying the second service.

However, in another time period, the first data stream received by the OLT includes the first data frame carrying the first service, but does not include the second data frame carrying the second service. In this case, the correspondingly sent second data stream does not include the second slice for carrying the second service. The method further includes:

The OLT generates at least one first idle frame, where a length of the first idle frame is the first preset length; the second data stream further includes the first idle frame, the time interval is completely or partially used to transmit the at least one first idle frame, and the at least one first idle frame in the scheduling periodicity occupies the second preset slot.

Therefore, in this embodiment, even if the second service has no traffic currently, the first idle frame is still inserted into the second data stream, to occupy the second preset slot for transmitting the second service. When the second service suddenly has traffic at a next moment, the second service data can still occupy the second preset slot, so that the delay and the delay variation of transmission of the second service can be effectively and stably reduced.

Figure 14:
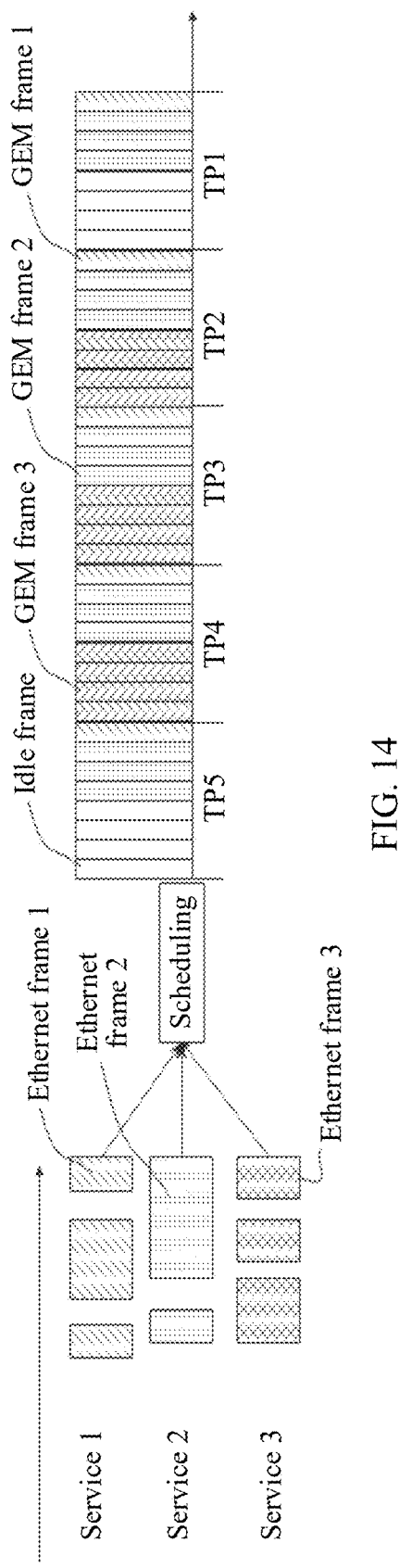
FIG. 14 is a schematic diagram of scheduling according to an embodiment of the present invention.

FIG. 14 is a schematic diagram of scheduling according to an embodiment of the present invention. An upstream port of an OLT receives an Ethernet frame 1 carrying a service 1, an Ethernet frame 2 carrying a service 2, and an Ethernet frame 3 carrying a service 3 respectively. The OLT converts the Ethernet frame 1 into a GEM frame 1, the Ethernet frame 2 into a GEM frame 2, and the Ethernet frame 3 into a GEM frame 3. The GEM frame 1 carrying the service 1 occupies a slot 1 of a scheduling periodicity, the GEM frame 2 carrying the service 2 occupies a slot 2 of the scheduling periodicity, and the GEM frame 3 carrying the service 3 occupies a slot 3 of the scheduling periodicity. Therefore, it can be ensured that data transmission of the service 1, the service 2, and the service 3 has low delays and delay variations. It can be learned from FIG. 14 that the slot 1 is the shortest, the slot 2 is the middle, and the slot 3 is the longest. According to the slot length, it can be learned that a bandwidth allocated by the OLT to the service 3 accounts for half of a total bandwidth, the bandwidth occupied by the service 3 is four times a bandwidth occupied by the service 1, and a bandwidth occupied by the service 2 is three times the bandwidth occupied by the service 1. Therefore, corresponding bandwidths can be allocated to various services based on bandwidth requirements of the various services, to ensure that low delays and delay variations can be obtained during data transmission of services with various bandwidth requirements.

Further, in an embodiment, a first data stream may further include a data frame that has a low delay requirement. For example, the first data stream further includes a third data frame. The third data frame carries a third service, and the third service has a low transmission delay requirement. The method further includes step S211: The OLT slices the third data frame to generate at least one third slice. The second data stream further includes the third slice, and the third slice occupies at least some slots in other slots than the first preset slot. It may be understood that, the third slice may not be transmitted for a scheduling periodicity.

Figure 15:
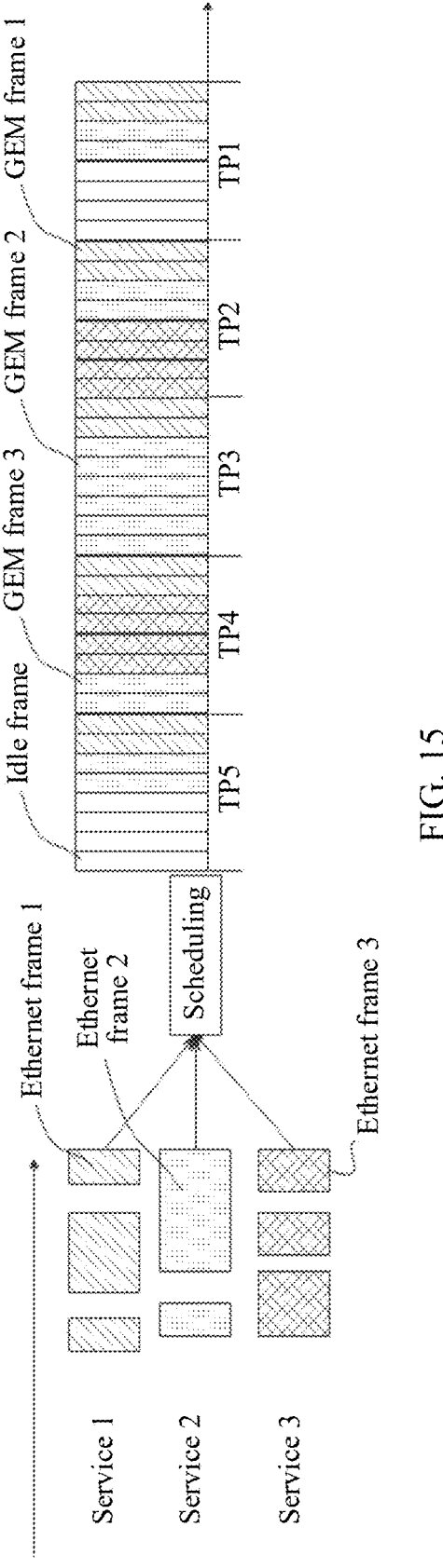
FIG. 15 is a schematic diagram of scheduling according to another embodiment of the present invention.

FIG. 15 is a schematic diagram of scheduling according to another embodiment of the present invention. An upstream port of an OLT receives an Ethernet frame 1 carrying a service 1, an Ethernet frame 2 carrying a service 2, and an Ethernet frame 3 carrying a service 3 respectively. The OLT converts the Ethernet frame 1 into a GEM frame 1, the Ethernet frame 2 into a GEM frame 2, and the Ethernet frame 3 into a GEM frame 3. The service 1 and the service 2 have a low delay requirement, and the service 3 has a high delay requirement. The GEM frame carrying the service 3 occupies a slot 1 in a scheduling periodicity, and the GEM frame 1 carrying the service 1 and the GEM frame 2 carrying the service 2 jointly occupy other slots in the scheduling periodicity than the slot 1. As shown in FIG. 15, in each of scheduling periodicities TP1 to TP5, the GEM frame 1 carrying the service 1 occupies fixed duration and a fixed slot central position. It is assumed that in each scheduling periodicity, a slot occupied by the GEM frame 1 is the slot 1, and in the scheduling periodicity TP2, the GEM frame 2 carrying the service 2 and the GEM frame 3 carrying the service 3 occupy other slots than the slot 1. In the scheduling periodicity TP3, the GEM frame carrying the service 2 occupies other slots than the slot 1. In the scheduling periodicity TP4, the GEM frame 2 carrying the service 2 and the GEM frame 3 carrying the service 3 occupy other slots than the slot 1. Packet-level scheduling may be performed on the data frames carrying the service 2 and the service 3 based on service priorities. Therefore, it can be ensured that data transmission of the service 1 has a low delay and a low delay variation while packet-level scheduling is performed on data of the service 2 and the service 3.

In an embodiment, a first data frame includes a first service identifier, and the first service identifier identifies the first service; or the OLT determines, based on an upstream port that receives the first data frame, the first service identifier or the first service carried in the first data frame.

In an embodiment, the first slice includes the first service identifier; or the OLT sends the first slice through a first downstream PON port associated with the first service.

In an embodiment, the second data frame includes a second service identifier, and the second service identifier identifies the second service; or the OLT determines, based on an upstream port that receives the second data frame, the second service identifier or the second service carried in the second data frame.

In an embodiment, the second slice includes the second service identifier; or the OLT sends the second slice through a first downstream PON port associated with the second service.

In an embodiment, the third data frame includes a third service identifier, and the third service identifier identifies the third service; or the OLT determines, based on an upstream port that receives the third data frame, the third service identifier or the third service carried in the third data frame.

In an embodiment, the third slice includes the third service identifier; or the OLT sends the third slice through a first downstream PON port associated with the third service.

It may be understood that, for a process in which the OLT converts the data frames in the first data stream into the data frames in the second data stream, refer to the foregoing related description of step S201, and details are not described herein again. For specific embodiments of various data frames in the first data stream, refer to the foregoing related description of the first data frame. Details are not described herein again. For specific embodiments of various data frames in the second data stream, refer to the foregoing related description of the first slice. Details are not described herein again.

It may be understood that, for details of the second preset slot, refer to the first preset slot. A principle of the second preset slot is similar to that of the first preset slot. Details are not described herein again.

Figure 17:
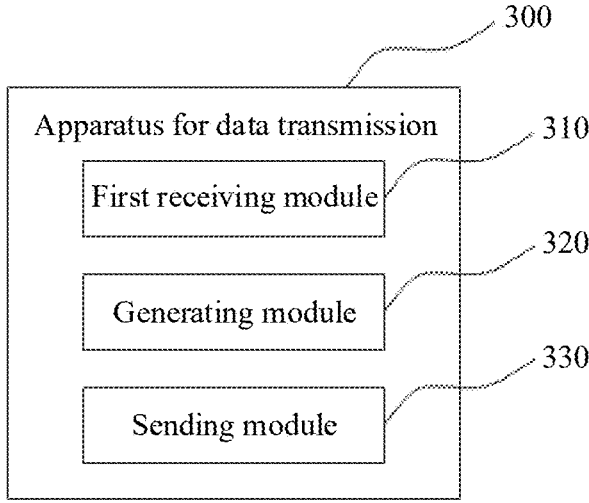
FIG. 17 is a schematic diagram of an example hardware structure of an apparatus for data transmission according to an embodiment of the present invention.

The present invention further provides an apparatus 300 for data transmission. As shown in FIG. 17, the apparatus includes: a first receiving module 310, a generating module 320, and a sending module 330. The first receiving module 310 is configured to perform step S200. The generating module 320 is configured to perform step S201 and step S206. The sending module 330 is configured to perform step S202.

For more details about when the modules of the apparatus perform the foregoing steps, refer to related descriptions of embodiments of the foregoing method and the accompanying drawings. Details are not described herein again.

This embodiment of this application also has various beneficial effects described in the foregoing method embodiments, and details are not described herein again.

Figure 18:
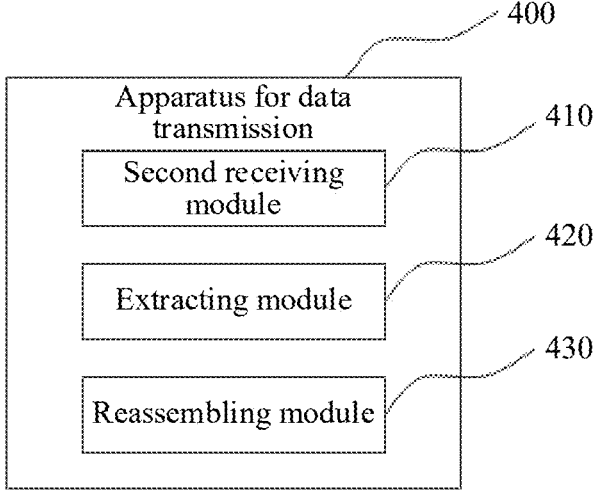
FIG. 18 is a schematic diagram of an example hardware structure of an apparatus for data transmission according to another embodiment of the present invention.

The present invention further provides an apparatus 400 for data transmission. As shown in FIG. 18, the apparatus includes: a second receiving module 410, an extracting module 420, and a reassembling module 430. The second receiving module 410 is configured to perform step S203, the extracting module 420 is configured to perform step S204 and step S207, and the reassembling module 430 is configured to perform step S205 and step S208.

For more details when the modules of the apparatus perform the foregoing steps, refer to related descriptions of embodiments of the foregoing method and the accompanying drawings. Details are not described herein again.

This embodiment of this application also has various beneficial effects described in the foregoing method embodiments, and details are not described herein again.

Figure 19:
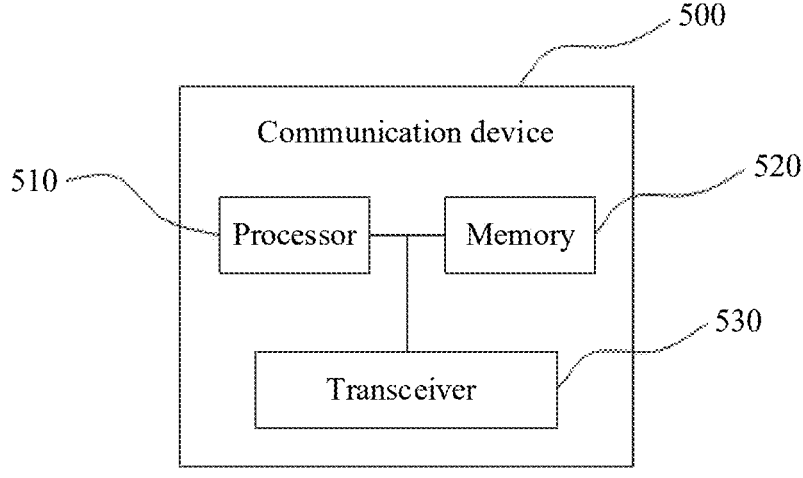
FIG. 19 is a schematic diagram of an example hardware structure of a communication device according to an embodiment of the present invention.

The present invention further provides a communication device 500. As shown in FIG. 19, the communication device 500 includes: a processor 510, a memory 520, and a transceiver 530.

The processor 510 may be a general-purpose central processing unit (CPU), a microprocessor, an application-specific integrated circuit ASIC, or at least one integrated circuit, and is configured to execute a related program, to implement the technical solutions provided in embodiments of this application.

The memory 520 may be a read-only memory (ROM), a static storage device, a dynamic storage device, or a random access memory (Random Access Memory, RAM). The memory 520 may store an operating system and another application program. When the technical solutions provided in embodiments of this application are implemented by using software or hardware, program code for implementing the technical solutions provided in embodiments of this application is stored in the memory 520, and is executed by the processor 510.

In an embodiment, the processor 510 may include the memory 520. In another embodiment, the processor 510 and the memory 520 are two independent structures.

The transceiver 530 may include an optical transmitter and/or an optical receiver. The optical transmitter may be configured to send an optical signal, and the optical receiver may be configured to receive an optical signal. The optical transmitter may be implemented by using a light emitting device, for example, a gas laser, a solid state laser, a liquid laser, a semiconductor laser, or a direct modulated laser. The optical receiver may be implemented by using an optical detector, for example, a photodetector or a photodiode (for example, an avalanche diode). The transceiver 540 may further include a digital-to-analog converter and an analog-to-digital converter.

The processor 510 is configured to perform step S201 and step S206.

The transceiver 530 is configured to perform step S200 and step S202.

For more details when the communication device 500 performs the foregoing steps, refer to related descriptions of embodiments of the foregoing method and the accompanying drawings. Details are not described herein again.

This embodiment of this application also has various beneficial effects described in the foregoing method embodiments, and details are not described herein again.

Figure 20:
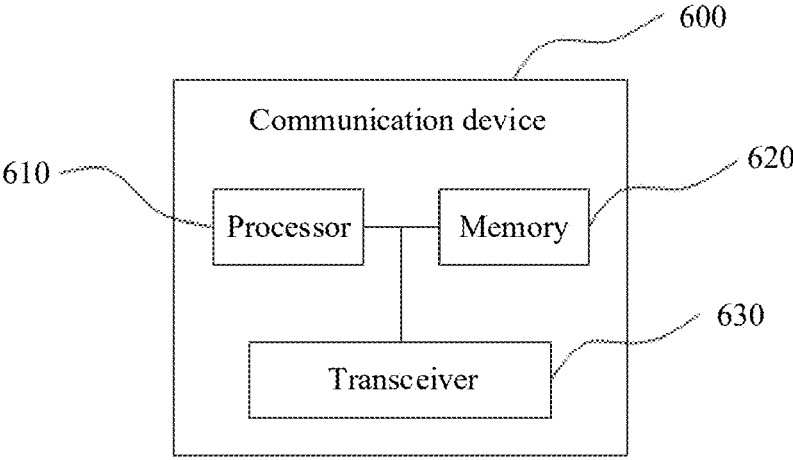
FIG. 20 is a schematic diagram of an example hardware structure of a communication device according to another embodiment of the present invention.

The present invention further provides a communication device 600. As shown in FIG. 20, the communication device 600 includes a processor 610, a memory 620, and a transceiver 630.

The processor 610 may be a general-purpose central processing unit (CPU), a microprocessor, an application-specific integrated circuit ASIC, or at least one integrated circuit, and is configured to execute a related program, to implement the technical solutions provided in embodiments of this application.

The memory 620 may be a read-only memory (ROM), a static storage device, a dynamic storage device, or a random access memory (RAM). The memory 620 may store an operating system and another application program. When the technical solutions provided in embodiments of this application are implemented by using software or firmware, program code for implementing the technical solutions provided in embodiments of this application is stored in the memory 620, and is executed by the processor 610.

In an embodiment, the processor 610 may include the memory 620. In another embodiment, the processor 610 and the memory 620 are two independent structures.

The transceiver 630 may include an optical transmitter and/or an optical receiver. The optical transmitter may be configured to send an optical signal, and the optical receiver may be configured to receive an optical signal. The optical transmitter may be implemented by using a light emitting device, for example, a gas laser, a solid state laser, a liquid laser, a semiconductor laser, or a direct modulated laser. The optical receiver may be implemented by using an optical detector, for example, a photodetector or a photodiode (for example, an avalanche diode). The transceiver 630 may further include a digital-to-analog converter and an analog-to-digital converter.

The processor 610 is configured to perform step S204, step S207, step S205, and step S208.

The transceiver 630 is configured to perform step S203.

For more details when the communication device 600 performs the foregoing steps, refer to related descriptions of embodiments of the foregoing method and the accompanying drawings. Details are not described herein again.

This embodiment of this application also has various beneficial effects described in the foregoing method embodiments, and details are not described herein again.

The present invention further provides a communication system. The communication system includes the communication device 500 and the communication device 600 described in the foregoing embodiments. For details, refer to the foregoing embodiments. Details are not described herein again.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, procedures or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid state disk Solid State Disk (SSD)), or the like.

To sum up, the foregoing descriptions are merely embodiments of the present invention, and are not intended to limit the protection scope of the present invention. Any modification, equivalent replacement, or improvement made without departing from the spirit and principle of the present invention shall fall within the protection scope of the present invention.

What is claimed is:

1. A method, comprising:
  receiving, by an optical line terminal (OLT), a first data stream, wherein the first data stream comprises a first data frame, and the first data frame carries a first service;
  slicing, by the OLT, the first data frame to generate a plurality of first slices, wherein a length of each first slice of the plurality of first slices is a first preset length, and each of the plurality of first slices is sliced from the first data frame; and
  sending, by the OLT, a second data stream to an optical network unit (ONU), wherein the second data stream comprises the plurality of first slices, a time period in which the OLT sends the second data stream comprises a plurality of consecutive scheduling periods, at least a part of a time period in each scheduling period of the plurality of consecutive scheduling periods is occupied by at least one first slice of the plurality of first slices, and at least one time interval between at least two consecutive first slices of the plurality of first slices is completely or partially used to transmit data carrying a second service.

2. The method according to claim 1, wherein in each scheduling period of the plurality of consecutive scheduling periods, the at least one first slice sent in the respective scheduling period occupies a first preset slot, and each first preset slot satisfies at least one of having a fixed duration or having a fixed slot central position.

3. The method according to claim 1, wherein the first data stream further comprises a second data frame carrying the second service, and the method further comprises:
  slicing, by the OLT, the second data frame to generate a plurality of second slices, wherein a length of each second slice of the plurality of second slices is the first preset length, wherein the second data stream further comprises the plurality of second slices, and the at least one time interval between the at least two consecutive first slices of the plurality of first slices is completely or partially used to transmit at least one second slice of the plurality of second slices.

4. The method according to claim 3, wherein in each scheduling period of the plurality of consecutive scheduling periods, at least one second slice is sent in the respective scheduling period and occupies a second preset slot, and each second preset slot satisfies at least one of having a fixed duration or having a fixed slot central position.

5. The method according to claim 1, further comprising:
  generating, by the OLT, at least one first idle frame, wherein a length of each first idle frame of the at least one first idle frame is the first preset length, wherein the second data stream further comprises the at least one first idle frame, the at least one time interval between the at least two consecutive first slices of the plurality of first slices is completely or partially used to transmit the at least one first idle frame, and each first idle frame of the at least one first idle frame occupies a second preset slot in a scheduling period of the plurality of consecutive scheduling periods.

6. The method according to claim 1, wherein the first data frame comprises a first payload, and slicing, by the OLT, the first data frame to generate the plurality of first slices comprises:
  dividing, by the OLT, the first payload into at least two parts when a length of the first payload is greater than a second preset length, wherein a second payload is generated correspondingly to each part of the at least two parts, a length of the second payload is equal to the second preset length, and the second preset length is less than the first preset length; and
  adding, by the OLT, a frame header to each second payload to form the plurality of first slices, wherein any one of the second payloads satisfies one of the following condition 1 and condition 2:
  condition 1: the second payload comprises a part obtained by dividing the first payload; or condition 2: the second payload comprises a part obtained by dividing the first payload and a padding bit.

7. The method according to claim 1, wherein the first data frame is an Ethernet frame or an optical data unit (ODU) frame.

8. The method according to claim 1, wherein:
  the first data frame comprises a first service identifier, and the first service identifier identifies the first service; or
  the OLT determines, based on an upstream port that receives the first data frame, the first service identifier or the first service carried in the first data frame.

9. The method according to claim 8, wherein:
  at least one first slice comprises the first service identifier; or
  the OLT sends at least one first slice through a first downstream PON port associated with the first service.

10. A method, comprising:
  receiving, by an optical network unit (ONU), a second data stream sent by an optical line terminal (OLT), wherein the second data stream comprises a plurality of first slices, a length of each first slice of the plurality of first slices is a first preset length, the plurality of first slices carries a first service, a time period in which the ONU receives the second data stream comprises a plurality of consecutive scheduling periods, at least a part of a time period in each scheduling period of the plurality of consecutive scheduling periods is occupied by at least one first slice, at least one time interval between at least two consecutive first slices of the plurality of first slices is completely or partially used to transmit data carrying a second service, and each first slice of the plurality of first slices comprises a second payload;
  identifying, by the ONU, each first slice of the plurality of first slices, and extracting the second payload in each first slice; and
  reassembling, by the ONU, the extracted second payloads to generate a first data frame.

11. The method according to claim 10, wherein in each scheduling period of the plurality of consecutive scheduling periods, the at least one first slice sent in the respective scheduling period occupies a first preset slot, and each first preset slot satisfies at least one of having fixed duration or having a fixed slot central position.

12. The method according to claim 10, wherein the second data stream further comprises a plurality of second slices, a length of each second slice of the plurality of second slices is the first preset length, the plurality of second slices carries the second service, the at least one time interval is completely or partially used to transmit at least one second slice of the plurality of second slices, each second slice of the plurality of second slices comprises a fourth payload, and the method further comprises:

identifying, by the ONU, each second slice of the plurality of second slices, and extracting the fourth payload in each second slice; and reassembling, by the ONU, the extracted fourth payloads to generate a second data frame.

13. The method according to claim 12, wherein in each scheduling period, the at least one second slice sent in the respective scheduling period occupies a second preset slot, and each second preset slot satisfies at least one of having fixed duration or having a fixed slot central position.

14. The method according to claim 10, wherein the second data stream further comprises at least one first idle frame, a length of each first idle frame of the at least one first idle frame is the first preset length, the at least one time interval is completely or partially used to transmit the at least one first idle frame, and each first idle frame of the at least one first idle frame occupies a second preset slot in a scheduling period of the plurality of consecutive scheduling periods.

15. An apparatus, comprising:

a memory storing instructions;

a transceiver; and at least one processor coupled to the memory and the transceiver, and configured to execute the instructions, and wherein executing the instructions causes the apparatus to:

receive a first data stream, wherein the first data stream comprises a first data frame, and the first data frame carries a first service;

slice the first data frame to generate a plurality of first slices, wherein a length of each first slice of the plurality of first slices is a first preset length, and each of the plurality of first slices is sliced from the first data frame; and send a second data stream, wherein the second data stream comprises the plurality of first slices, a time period in which the apparatus sends the second data stream comprises a plurality of consecutive scheduling periods, at least a part of a time period in each scheduling period of the plurality of consecutive scheduling periods is occupied by at least one first slice of the plurality of first slices, and at least one time interval between at least two consecutive first slices is completely or partially used to transmit data carrying a second service.

16. The apparatus according to claim 15, wherein in each scheduling period of the plurality of consecutive scheduling periods, the at least one first slice sent in the respective scheduling period occupies a first preset slot, and each first preset slot satisfies at least one of having fixed duration or having a fixed slot central position.

17. The apparatus according to claim 15, wherein the first data stream further comprises a second data frame for carrying the second service, the second data stream further comprises a plurality of second slices, and the at least one time interval between the at least two consecutive first slices is completely or partially used to transmit at least one second slice of the plurality of second slices; and wherein executing the instructions further causes the apparatus to slice the second data frame to generate the plurality of second slices, and a length of each second slice of the plurality of second slices is the first preset length.

18. The apparatus according to claim 15, wherein executing the instructions further causes the apparatus to generate at least one first idle frame, wherein a length of each first idle frame of the at least one first idle frame is the first preset length; and wherein the second data stream further comprises the at least one first idle frame, the at least one time interval is completely or partially used to transmit the at least one first idle frame, and each first idle frame of the at least one first idle frame occupies a second preset slot in a scheduling period of the plurality of consecutive scheduling periods.

19. An apparatus, comprising:

a memory storing instructions;

a transceiver; and at least one processor coupled to the memory and the transceiver, configured to execute the instructions, and wherein executing the instructions causes the apparatus to:

receive a second data stream sent by an optical line terminal (OLT), wherein the second data stream comprises a plurality of first slices, a length of each first slice of the plurality of first slices is a first preset length, the plurality of first slices carries a first service, a time period in which the second data stream is received comprises a plurality of consecutive scheduling periods, at least a part of a time period in each scheduling period of the plurality of consecutive scheduling periods is occupied by at least one first slice of the plurality of first slices, at least one time interval between at least two consecutive first slices of the plurality of first slices is completely or partially used to transmit data carrying a second service, and each first slice of the plurality of first slices comprises a second payload;

identify each first slice of the plurality of first slices, and extract the second payload in each first slice; and reassemble the extracted second payloads to generate a first data frame.

20. The apparatus according to claim 19, wherein the second data stream further comprises a plurality of second slices, a length of each second slice of the plurality of second slices is the first preset length, the plurality of second slices carries the second service, the at least one time interval is completely or partially used to transmit at least one second slice of the plurality of second slices, and each second slice of the plurality of second slices comprises a fourth payload; and wherein executing the instructions further causes the apparatus to identify each second slice of the plurality of second slices, extract the fourth payload in each second slice, and reassemble the extracted fourth payloads to generate a second data frame.

\* \* \* \* \*